Nov. 20, 1923.

E. M. POST, JR 1,474,732

SELF PROPELLED RAILWAY CAR

Filed Sept. 1, 1922

INVENTORS
Edwin M. Post, Jr.
BY
Redding & Greeley
ATTORNEYS

Patented Nov. 20, 1923.

1,474,732

UNITED STATES PATENT OFFICE.

EDWIN M. POST, JR., OF NEW YORK, N. Y., ASSIGNOR TO INTERNATIONAL MOTOR COMPANY, OF NEW YORK, N. Y., A CORPORATION OF DELAWARE.

SELF-PROPELLED RAILWAY CAR.

Application filed September 1, 1922. Serial No. 585,597.

*To all whom it may concern:*

Be it known that I, EDWIN M. POST, Jr., a citizen of the United States, residing in the borough of Manhattan of the city of New York, in the State of New York, have invented certain new and useful Improvements in Self-Propelled Railway Cars, of which the following is a specification, reference being had to the accompanying drawing, forming a part thereof.

The development of railway cars propelled by internal combustion engines has given rise to many peculiar problems which have not been heretofore encountered either in the railway car art as known or in the automotive art as known. In fact, these problems have arisen primarily through the adaptation of certain automotive practises to railway practises and vice versa. To those skilled in the two arts it is well understood that the problem of providing a commercially satisfactory and mechanically efficient railway car propelled by an internal combustion engine mounted thereon cannot be solved by merely mounting the automotive vehicle on flanged wheels. The present invention is one of those many important single steps, which is contributing towards the successful adaptation of automotive practises to railway conditions. It has for its principal object to provide in combination with the leading truck of a self-propelled railway car and the vehicle chassis means whereby the propelling effort is transmitted from the chassis to the truck independent of the mounting interposed therebetween and the braking effort of the leading truck is transmitted to the vehicle chassis independent of the mounting interposed therebetween. A further object of the invention is to provide such means which shall be of simple and rigid construction, readily accessible and completely adaptable to other necessary units of the chassis and truck. More particularly the invention has to do with the provision of an improved organization of parts in which a radius rod is secured in swiveled connection with the spring bracket on the chassis of a self-propelled railway car and with the spring saddle on the leading truck thereof.

Another and important object of the invention is to preserve the best in automotive practise as concerns the suspension of the frame by connecting the springs as heretofore to the frame and supporting them on the bolster of the truck. Heretofore railway practise has provided for the interposition of springs between the axles and bolster rather than between the bolster and the frame. It is this improved practise in vehicles to be driven on rails which demands, preferably, the provision of an independent connection between the frame and the truck.

The invention will be described with greater particularity in its preferred embodiment with reference to the accompanying drawing, wherein—

It will be understood as the description proceeds that the invention is not to be limited to the details of construction of the chassis or truck of the self-propelled railway car with which the improved swivel connection is associated, but it is true, in a patent sense, that one phase of the invention resides in an improved combination of parts wherein a car chassis and a leading truck are usual elements. Further, it will appear clearly as the description proceeds that the preferred embodiment of the invention as respects the form of spring connections and the radius rod is illustrated herein, but only such claims as particularly recite these details are to be considered as limited thereto.

Figure 1:
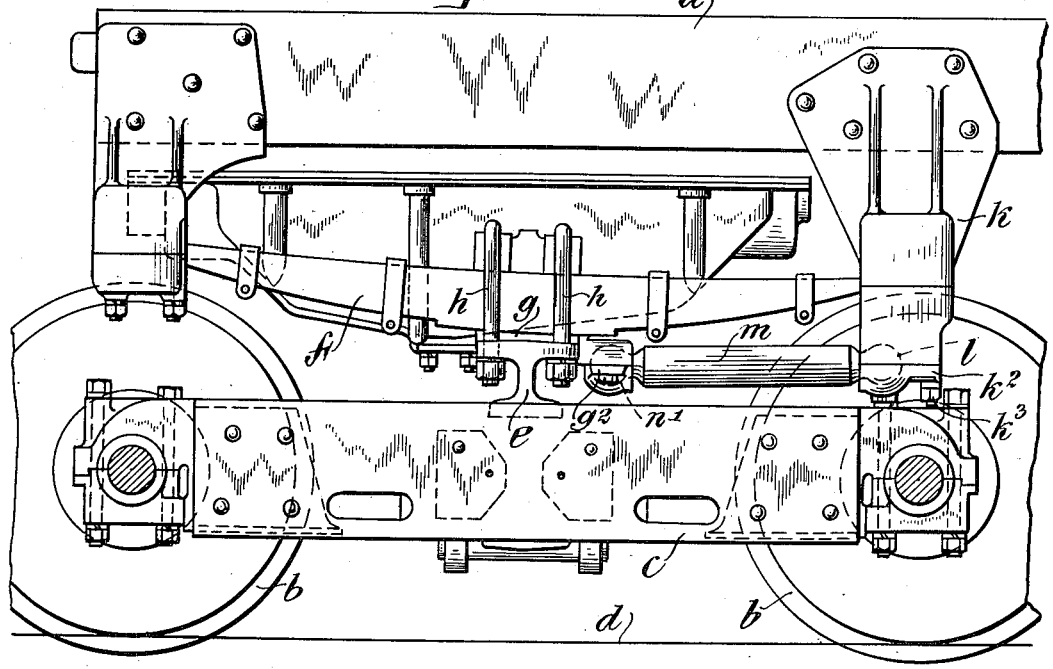
Figure 1 is a view in side elevation of so much of the chassis and truck of a self-propelled railway car as is necessary for an understanding of the improved connection therebetween.
Figure 2:
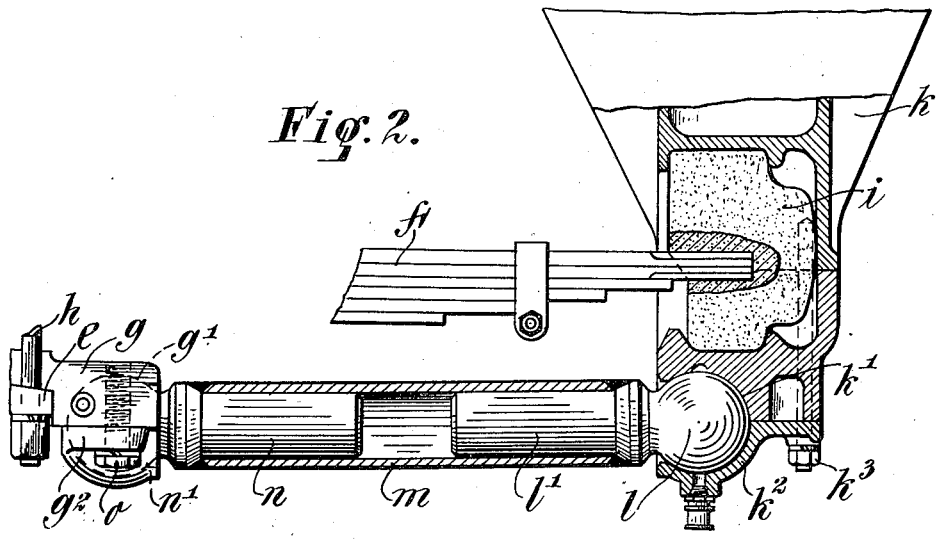
Figure 2 is a detail view on a somewhat larger scale, partly in section and partly in side elevation, showing the improved radius rod and the means for securing it in swiveled connection with the spring bracket and the spring saddle.

Referring to Figure 1, there is shown the side frame member *a* adjacent to the front end of the chassis of an automotive vehicle of approved form, this end of the vehicle being mounted on the flanged wheels *b* through the medium of what is generally termed in the railway art, a leading truck *c*. The wheels *b* run idly on rails indicated conventionally at *d*, other drive wheels of approved form (not illustrated) being provided in accordance with known practises. On the truck c is mounted a transverse bolster e which supports thereon the vehicle springs f, as through spring saddles g of suitable form. The bolster e is mounted to swivel with respect to the truck in any suitable manner, such as illustrated, for example, in U. S. Patent No. 1,423,238. The vehicle springs f may be bolted in place by U-bolts h which pass through the bolster e. The ends of the spring f are connected to the frame a in any approved manner, but in the preferred form there is illustrated a rubber block connector i housed in a bracket k which is riveted to the frame a. The bracket k, in the illustrated embodiment, may carry therewith a two-part ball socket $k'$ in which may be secured a ball l. A bearing cap $k^2$ permits the separation of the socket for the connecting and disconnecting of the ball l. Bolts $k^3$ retain the cap $k^2$ removably in position. The ball l constitutes one end of a radius rod m which may be formed as a hollow tube having the stem $l'$ of the ball welded therein. At the other end a similar stem n of a ball $n'$ may be welded in the tube. The spherical bearing seat for the ball $n'$ is preferably formed within the spring saddle g as indicated by dotted lines $g'$ in Figure 2. A complementary bearing cap $g^2$ may be bolted to the saddle g as by means of a bolt o for the purpose of permitting the connection and disconnection of the ball $n'$, as will be understood.

The uses and advantages of the improved organization of parts should now be apparent. The automotive frame a has connected thereto vehicle springs f in accordance with established automotive practise. These springs are supported on and connected to a truck bolster e of a truck c which conforms, in other respects, to a standard railway leading truck. The spring saddles g find an adequate support on the truck bolster e so that the adaptation of the automotive vehicle to railway practise is at once made simple and effective. In standard railway car practise the springs are usually interposed between the bolster and the axles. Having mounted the chassis in the manner described, however, the problem of transmitting the torque or driving thrust from the frame to the truck becomes a problem, since it is not believed that this torque or thrust should be taken through the springs and their connection to the chassis and their mounting on the bolster. Accordingly, in the improved combination a radius rod is interposed operatively between the frame a and the truck c so that the truck is propelled by a thrust transmitted through the radius rod. The actual connection is simple and advantage is taken of the presence of some necessary elements on both the frame and the truck to adapt them to such connection. For instance, the spring bracket k has been made of such form as to afford a swivel connection through the ball l and socket $k'$ with the radius rod, while the spring saddle g has been formed with a spherical seat $g'$ to receive the ball $n'$. In its broader aspects the invention is not to be limited to such details even though they be advantageous. Further, it will be evident that the radius rod in its illustrated relation exerts what may be termed a "push" on the truck c when the car is moving forward and a "pull" when the car is moving backwards. The reverse is true when the brakes of the leading truck are applied for the purpose of retarding the vehicle as a whole. The results sought for herein would be accomplished to a degree by reversing the relationship so that the rod m would normally be in tension and exerting a "pull" on the truck.

It will be understood that while only one radius rod and spring are illustrated, a similar spring will be provided at the other side of the truck and a similar radius rod may be provided. Two radius rods so disposed and connected operatively to the frame and to the bolster do not, of course, interfere with free swiveling of the leading truck.

The departures indicated herein from the illustrated embodiment are such as might suggest themselves to those skilled in the art and are to be considered within the scope of the invention provided the results are secured by means which fall within the appended claims.

I claim as my invention:

1. In a self-propelled railway car, in combination with the chassis and leading truck bolster, springs connected to the chassis, spring seats connected to the bolster, and a radius rod operatively interposed between the chassis and the bolster to transmit propelling thrust from the frame to the truck.

2. In a self-propelled railway car, in combination with the side frame member of the chassis, the leading truck and bolster, a vehicle spring, a spring bracket connecting one end of the spring with the side frame member, a spring saddle on the bolster and a radius rod connected operatively to the spring saddle and to the spring bracket.

3. In a self-propelled railway car, in combination with the side frame member of the chassis and the leading truck and bolster, a spring bracket secured to the side frame member, a vehicle spring having one end connected to the bracket, a spring saddle on the bolster, spherical socket bearings formed in the saddle and in the bracket, and a radius rod having ball ends seated respectively in said socket bearings.

4. In a self-propelled railway car, in combination with the side frame member of the chassis and the leading truck and bolster, a housing carried with the side frame member, a rubber block secured in said housing, a vehicle spring having one end connected to the side frame member through said rubber block, a spring saddle on the bolster, spherical socket bearings formed in the housing and in the saddle, a radius rod having ball ends seated respectively in said spherical sockets, and removable caps bolted over said ball ends.

This specification signed this 7th day of August A. D. 1922.

EDWIN M. POST, Jr.